(12) United States Patent
Dhindsa

(10) Patent No.: US 10,495,876 B1
(45) Date of Patent: Dec. 3, 2019

(54) MIRROR ATTACHMENT FOR LAPTOP COMPUTER WEBCAM

(71) Applicant: Gurtaj Dhindsa, San Jose, CA (US)

(72) Inventor: Gurtaj Dhindsa, San Jose, CA (US)

(*) Notice: Subject to any disclaimer, the term of this patent is extended or adjusted under 35 U.S.C. 154(b) by 72 days.

(21) Appl. No.: 15/973,614

(22) Filed: May 8, 2018

(51) Int. Cl.
G02B 7/182 (2006.01)
G02B 27/00 (2006.01)
G02B 17/06 (2006.01)

(52) U.S. Cl.
CPC ......... *G02B 27/0081* (2013.01); *G02B 7/182* (2013.01); *G02B 17/06* (2013.01)

(58) Field of Classification Search
CPC ..... G02B 7/182; G02B 17/06; G02B 27/0081
USPC .......................... 359/857, 858, 862, 865, 872
See application file for complete search history.

(56) References Cited

U.S. PATENT DOCUMENTS

| | | | | |
|---|---|---|---|---|
| 3,949,767 A | * | 4/1976 | Rose | A45D 42/04 132/301 |
| 4,605,291 A | * | 8/1986 | Jolly | G02B 7/1824 359/862 |
| 4,930,884 A | * | 6/1990 | Tichenor | G02B 17/023 359/857 |
| 6,027,218 A | * | 2/2000 | Kupniewski | G02B 17/02 359/856 |
| 6,322,222 B1 | * | 11/2001 | Kobayashi | G02B 5/08 248/467 |
| 6,926,416 B2 | * | 8/2005 | Sawyer | B60R 1/081 248/467 |
| D512,997 S | | 12/2005 | Lee | |
| 9,060,108 B1 | | 6/2015 | Kuffner | |
| 9,544,539 B2 | | 1/2017 | Roman | |
| 9,874,758 B2 | * | 1/2018 | Giraldo | G02B 27/022 |
| 2011/0081946 A1 | | 4/2011 | Singh | |
| 2014/0300980 A1 | | 10/2014 | Simon | |
| 2015/0062290 A1 | | 3/2015 | Lawton | |
| 2015/0316960 A1 | * | 11/2015 | Tseng | A45C 13/005 359/822 |
| 2016/0077307 A1 | | 3/2016 | Palmeri | |

FOREIGN PATENT DOCUMENTS

EP 2534518 A 12/2012

* cited by examiner

*Primary Examiner* — Ricky D Shafer
(74) *Attorney, Agent, or Firm* — Kyle A. Fletcher, Esq.

(57) ABSTRACT

The mirror attachment for laptop computer webcam is an optical device configured for use with the camera of a personal data device. The mirror attachment for laptop computer webcam adjusts the field of view of the camera without adjusting the position of the camera on the personal data device. The mirror attachment for laptop computer webcam comprises a plurality of mirrors, a plurality of hooks, and a plurality of hinges. The hinges contained within the plurality of hinges: a) assemble the plurality of mirrors; and, b) assemble each of the plurality of hooks. The plurality of hinges further: c) change the orientation of the plurality of mirrors to each other; and d) attach the plurality of mirrors to the personal data device such that the orientation of the plurality of mirrors can be adjusted relative to the personal data device.

20 Claims, 5 Drawing Sheets

MIRROR ATTACHMENT FOR LAPTOP COMPUTER WEBCAM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments including optical systems, more specifically, a catoptric system.

SUMMARY OF INVENTION

The mirror attachment for laptop computer webcam is configured for use with a personal data device such as a laptop computer. The personal data device is further defined with a camera and a display. Wherein the camera is further defined with a field of view. The mirror attachment for laptop computer webcam is configured for use with the camera. The mirror attachment for laptop computer webcam is an optical device. The mirror attachment for laptop computer webcam attaches to the personal data device such that the field of view of the camera can be adjusted without adjusting the position of the camera on the personal data device. The mirror attachment for laptop computer webcam comprises a plurality of mirrors, a plurality of hooks, and a plurality of hinges. The hinges contained within the plurality of hinges: a) assemble the plurality of mirrors; and, b) assemble each of the plurality of hooks. The plurality of hinges further: c) change the orientation of the plurality of mirrors to each other; and d) attach the plurality of mirrors to the personal data device such that the orientation of the plurality of mirrors can be adjusted relative to the personal data device.

These together with additional objects, features and advantages of the mirror attachment for laptop computer webcam will be readily apparent to those of ordinary skill in the art upon reading the following detailed description of the presently preferred, but nonetheless illustrative, embodiments when taken in conjunction with the accompanying drawings.

In this respect, before explaining the current embodiments of the mirror attachment for laptop computer webcam in detail, it is to be understood that the mirror attachment for laptop computer webcam is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mirror attachment for laptop computer webcam.

It is therefore important that the claims be regarded as including such equivalent construction insofar as they do not depart from the spirit and scope of the mirror attachment for laptop computer webcam. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
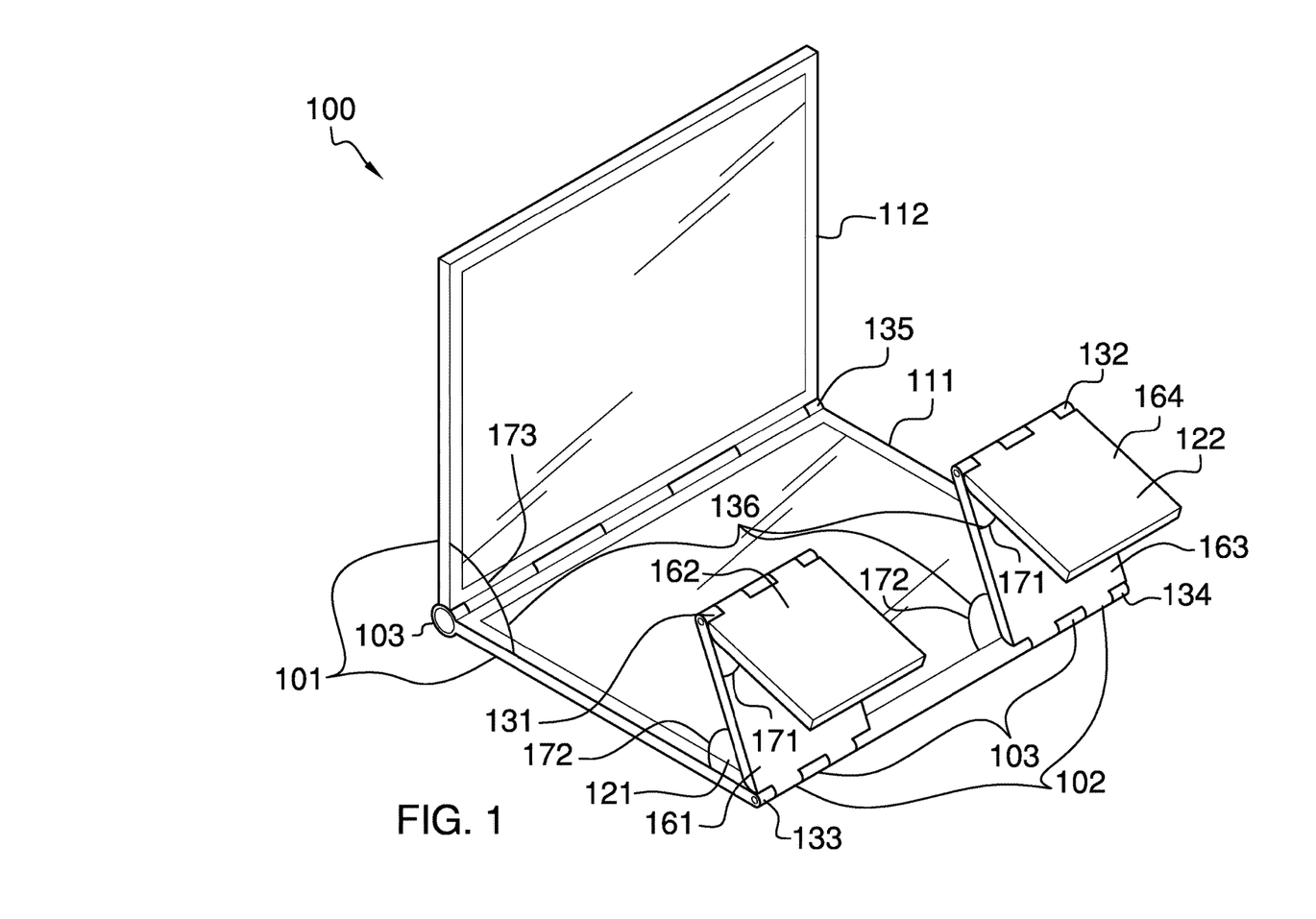
FIG. 1 is a perspective view of an embodiment of the disclosure.
Figure 2:
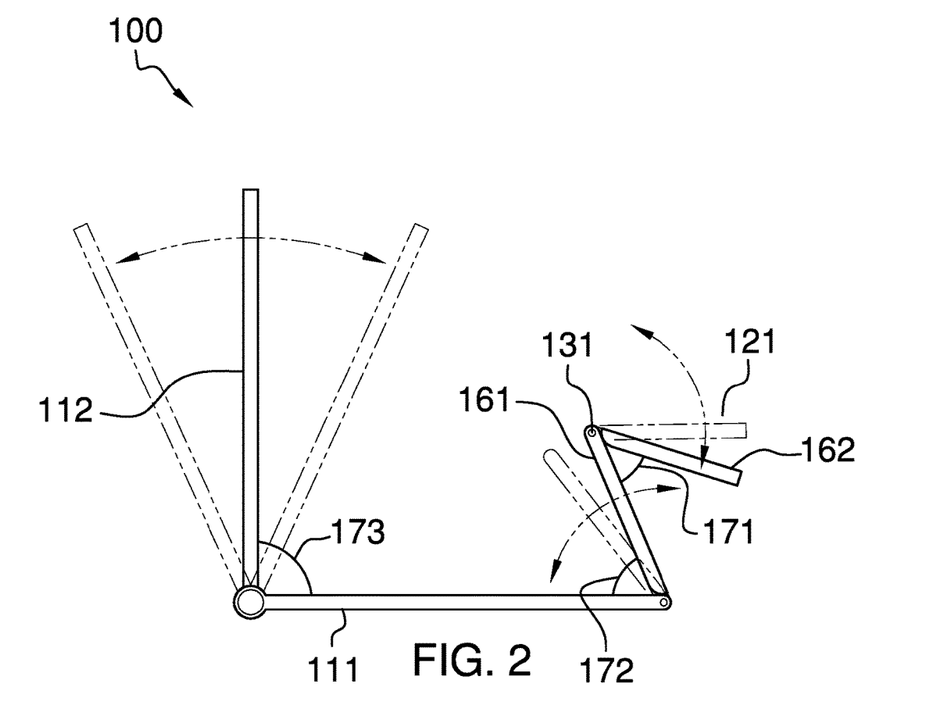
FIG. 2 is a side view of an embodiment of the disclosure.
Figure 3:
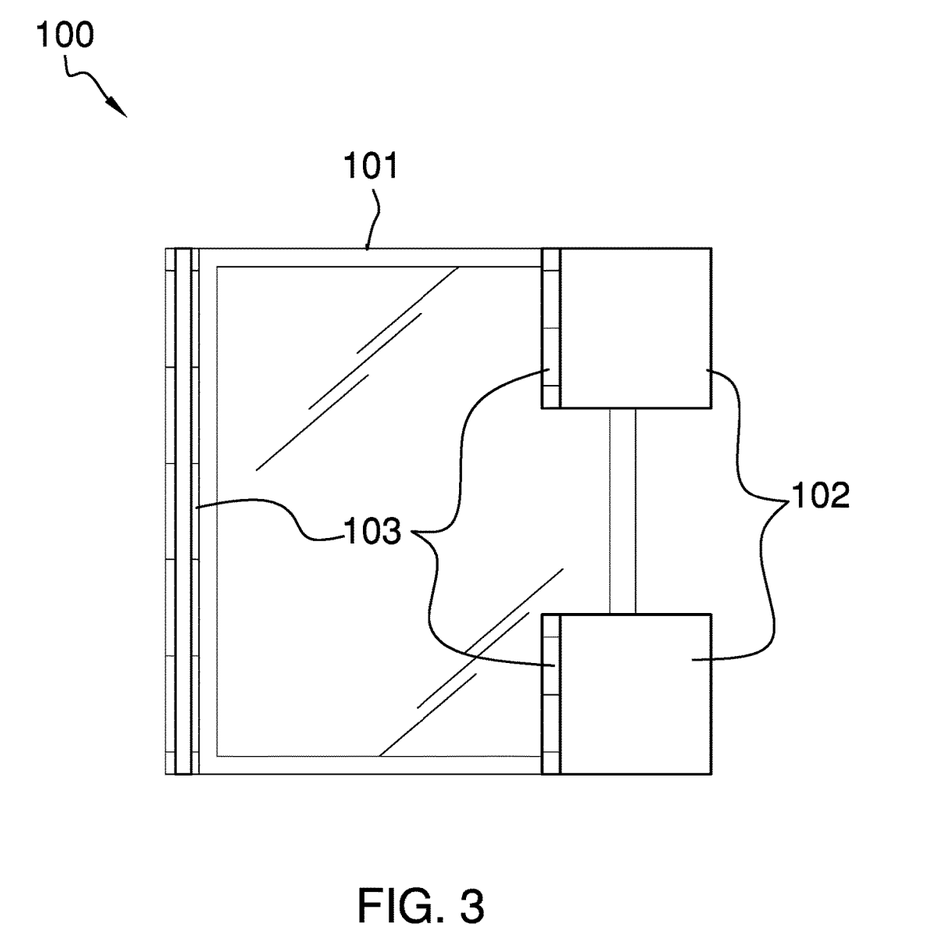
FIG. 3 is a top view of an embodiment of the disclosure.
Figure 4:
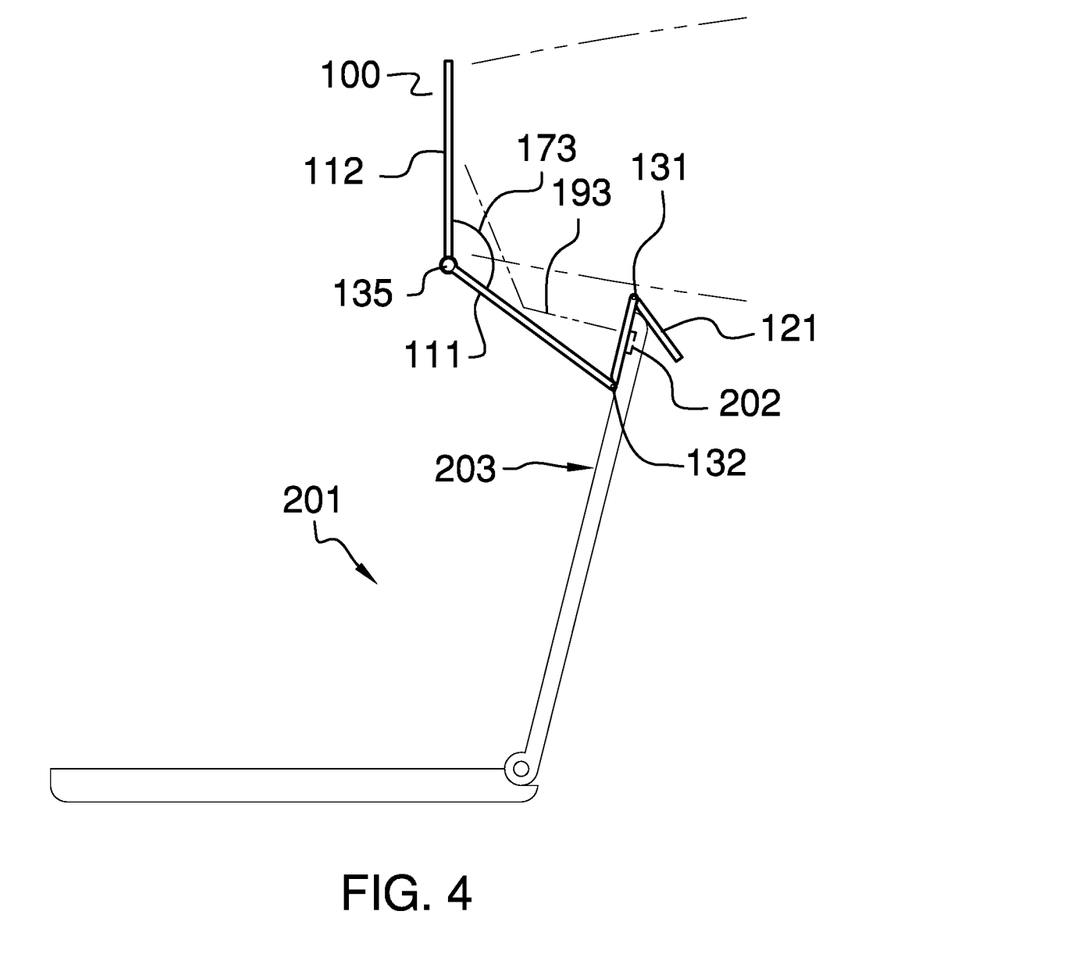
FIG. 4 is an in-use view of an embodiment of the disclosure.
Figure 5:
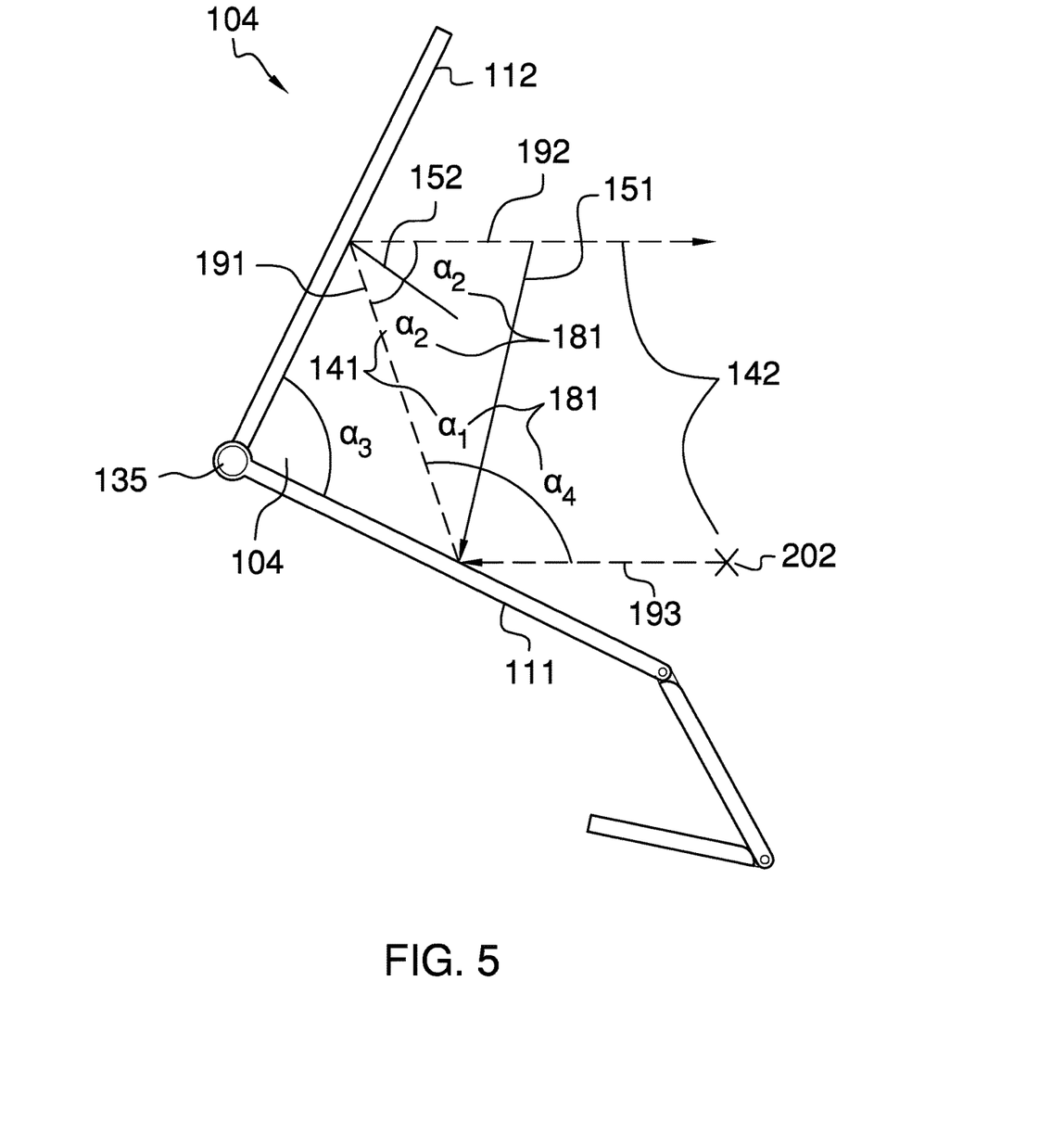
FIG. 5 is a detail view of an embodiment of the disclosure.

Detailed reference will now be made to one or more potential embodiments of the disclosure, which are illustrated in FIGS. 1 through 5.

The mirror attachment for laptop computer webcam 100 (hereinafter invention) is configured for use with a personal data device 201 such as a laptop computer. The personal data device 201 is further defined with a camera 202 and a display 203. The camera 202 mounts on the display 203. The camera 202 is further defined with a field of view. The invention 100 is configured for use with the camera 202. The invention 100 is an optical device. The invention 100 attaches to the personal data device 201 such that the field of view of the camera 202 can be adjusted without adjusting the position of the camera 202 relative to the display 203. The invention 100 comprises a plurality of mirrors 101, a plurality of hooks 102, and a plurality of hinges 103. The plurality of hooks 102 attach the plurality of mirrors 101 to the personal data device 201. The hinges contained within the plurality of hinges 103: a) assemble the plurality of mirrors 101; and, b) assemble each of the plurality of hooks 102. The plurality of hinges 103 further: c) change the orientation of the plurality of mirrors 101 to each other; and d) attach the plurality of mirrors 101 to the personal data device 201 such that the orientation of the plurality of mirrors 101 can be adjusted relative to the camera 202. The plurality of hinges 103 are configured such that the invention 100 can be collapsed into a flat structure for storage.

Each of the plurality of mirrors 101 is a flat reflective surface commonly referred to as a mirror. Each of the plurality of mirrors 101 reflects electromagnetic radiation. Each of the plurality of mirrors 101 are arranged to reflect electromagnetic radiation towards the camera 202. In this way, the plurality of mirrors 101 effectively adjust the field of view perceived by the camera 202. The plurality of mirrors 101 comprises a first mirror 111 and a second mirror 112. The plurality of mirrors 101 is further defined with a plurality of optical references 104.

The plurality of optical references 104 comprises a collection of angles and rays that define the optical properties of the invention 100. The plurality of optical references 104 further comprises a plurality of reflection angles 141 and a plurality of rays 142. The plurality of reflection angles 141 is further defined with a first incident angle 181 and a second incident angle 182. The plurality of rays 142 is further defined with a first reflected ray 191, a second reflected ray 192, and an incident ray 193.

The first mirror 111 is further defined with the first incident angle 181 selected from the plurality of reflection angles 141. The first mirror 111 is further defined with the first reflected ray 191 selected from the plurality of rays 142. The first mirror 111 is further defined with a first perpendicular 151.

The second mirror 112 is further defined with the second incident angle 182 selected from the plurality of reflection angles 141. The second mirror 112 is further defined with the second reflected ray 192 selected from the plurality of rays 142. The second mirror 112 is further defined with a second perpendicular 152.

The first mirror 111 is a commercially available flat mirror. The first mirror 111 reflects the incident ray 193 from the camera 202 to the second mirror 112 as the first reflected ray 191. The second mirror 112 is a commercially available flat mirror. The second mirror 112 reflects the first reflected ray 191 from the first mirror 111 to a new field of view as the second incident angle 182. The first perpendicular 151 refers to a line that projects perpendicularly away from the reflective surface of the first mirror 111 at a point where the incident ray 193 intersects the first mirror 111. The second perpendicular 152 refers to a line that projects perpendicularly away from the reflective surface of the second mirror 112 at a point where the first reflected ray 191 intersects the second mirror 112.

The camera 202 is further defined with the incident ray 193 selected from the plurality of rays 142. In this disclosure, the incident ray 193 of the camera 202 represents the field of view of the camera 202.

The first reflected ray 191 is the ray that is formed by the incident ray 193 after it has been reflected off the first mirror 111. The first incident angle 181 is defined as the angle between the incident ray 193 and the first perpendicular 151 of the first mirror 111. The angle between the first reflected ray 191 and the first perpendicular 151 of the first mirror 111 also equals the first incident angle 181.

The second reflected ray 192 is the ray that is formed by the first reflected ray 191 after it has been reflected off the second mirror 112. The second incident angle 182 is defined as the angle between the first reflected ray 191 and the second perpendicular 152 of the second mirror 112. The angle between the second reflected ray 192 and the second perpendicular 152 of the second mirror 112 also equals the second incident angle 182.

Each of the plurality of reflection angles 141 refers to an angle that is formed between a ray selected between the plurality of rays 142 and a mirror selected from the plurality of mirrors 101.

Each of the plurality of rays 142 refers to a line selected from the group consisting of: a) the line of sight of the camera 202; or, b) a line originating from the line of sight of the camera 202 that has been reflected by one or more mirrors selected from the plurality of mirrors 101. The line of sight of the camera 202 refers to a vector that: a) projects away from the camera 202; and, b) is directed towards the center of the field of view of the camera 202. Within this disclosure, the line of sight of the camera 202 is formally referred to as the incident ray 193.

The plurality of hooks 102 attach the plurality of mirrors 101 to the display 203 of the personal data device 201 during normal use of the invention 100. The plurality of hooks 102 hang the plurality of mirrors 101 from the superior surface of the display 203. The plurality of hooks 102 comprises a first hook 121 and a second hook 122.

The first hook 121 is a structure that hangs the plurality of mirrors 101 from the personal data device 201 such that the incident ray 193 of the camera 202 is in line with the first mirror 111. The first hook 121 comprises a first plate 161 and a second plate 162. The first plate 161 is a rectangular plate structure. The second plate 162 is a rectangular plate structure.

The second hook 122 is a structure that hangs the plurality of mirrors 101 from the personal data device 201 such that the incident ray 193 of the camera 202 is in line with the first mirror 111. The second hook 122 comprises a third plate 163 and a fourth plate 164. The third plate 163 is a rectangular plate structure. The fourth plate 164 is a rectangular plate structure.

Each of the plurality of hinges 103 is a locking hinge. The plurality of hinges 103 lock the plurality of optical references 104 into a fixed position during normal use of the invention 100. Each of the plurality of hinges 103 fixes the orientation between two components selected from the group consisting of the combination of the plurality of mirrors 101 and the plurality of hinges 103. A subset of the plurality of hinges 103 assemble the plurality of mirrors 101. A subset of the plurality of hinges 103 assembles each of the plurality of hooks 102. The plurality of hinges 103 comprises a first hinge 131, a second hinge 132, a third hinge 133, a fourth hinge 134, and a fifth hinge 135, and a plurality of hinge angles 136.

The first hinge 131 is a commercially available locking hinge. The first hinge 131 is used to assemble the first hook 121. The first hinge 131 is used to set the first hinge angle 171. The second hinge 132 is a commercially available locking hinge. The second hinge 132 is used to assemble the second hook 122. The second hinge 132 is used to set the first hinge angle 171.

The third hinge 133 is a commercially available locking hinge. The third hinge 133 is used to attach the first hook 121 to the first mirror 111. The third hinge 133 is used to set the second hinge angle 172. The fourth hinge 134 is a commercially available locking hinge. The fourth hinge 134 is used to attach the second hook 122 to the first mirror 111. The fourth hinge 134 is used to set the second hinge angle 172.

The fifth hinge 135 is a commercially available locking hinge. The fifth hinge 135 is used to attach the first mirror 111 to the second mirror 112. The fifth hinge 135 is used to set the third hinge angle 173.

Each of the plurality of hinge angles 136 is a cant that is formed by each hinge selected from the plurality of hooks 102. Each of the plurality of hinge angles 136 is adjusted to: a) adjust the plurality of optical references 104; or, b) to adjust the fit of the plurality of hooks 102 to the personal data device 201. The plurality of hinges 103 is further defined with a plurality of hinge angles 136. The plurality of hinge angles 136 comprises a first hinge angle 171, a second hinge angle 172, and a third hinge angle 173.

The first hinge angle 171 is the measure of the angle between the first plate 161 and the second plate 162 of the first hook 121. The first hinge angle 171 will also refer to the angle between the third plate 163 and the fourth plate 164 of the second hook 122 because that angle is always identical to the angle between the first plate 161 and the second plate 162 of the first hook 121.

The second hinge angle 172 is the measure of the angle between the first mirror 111 and the first plate 161 of the first hook 121. The second hinge angle 172 will also refer to the angle between the first mirror 111 and the third plate 163 of the first hook 121 because that angle is always identical to the angle between the first mirror 111 and the first plate 161 of the first hook 121.

The third hinge angle 173 is the measure of the angle between the first mirror 111 and the second mirror 112.

The following six paragraphs describe the assembly and operation of the invention 100.

The first hinge 131 attaches the first plate 161 to the second plate 162 to form the first hook 121 such that the first plate 161 rotates relative to the second plate 162 to form the first hinge angle 171. The second hinge 132 attaches the third plate 163 to the fourth plate 164 to form the second hook 122 such that the third plate 163 rotates relative to the fourth plate 164 to form the first hinge angle 171.

The third hinge 133 attaches the first plate 161 of the first hook 121 to the first mirror 111 such that the first plate 161 rotates relative to the first mirror 111 to form the second hinge angle 172. The fourth hinge 134 attaches the third plate 163 of the second hook 122 to the first mirror 111 such that the third plate 163 rotates relative to the first mirror 111 to form the second hinge angle 172.

The fifth hinge 135 attaches the first mirror 111 to the second mirror 112 such that the second mirror 112 rotates relative to the first mirror 111 to form the third hinge angle 173.

The first hinge angle 171 is set on the first hook 121 and the second hook 122 such that the invention 100 will hang from superior edge of the display 203 of the personal data device 201.

The first incident angle 181 adjusts by adjusting the second hinge angle 172 between the first hook 121, the second hook 122, and the first mirror 111. The second incident angle 182 determines the direction of the second reflected ray 192 which in turn determines the field of view of the camera 202. The second incident angle 182 adjusts by adjusting the third hinge angle 173 between the first mirror 111 and the second mirror 112. In this manner, the second incident angle 182 forms the adjusted field of view of the camera 202.

This disclosure describes a construction of the invention 100 results in a relationship where third hinge angle 173 will always equal the sum of the first incident angle 181 and the second incident angle 182. This disclosure describes a construction of the invention 100 that results in a relationship where when the third hinge angle 173 is a right angle, the second reflected ray 192 will be parallel to and in the reverse direction of the incident ray 193.

The following definitions were used in this disclosure:

Angle: As used in this disclosure, an angle is a measure of a region between two intersecting lines or surfaces.

Arc: As used in this disclosure, an arc refers to a portion of a circumference or a curved perimeter. When applied to an angle, the arc also refers to a measure of an angular span as measured from a circle at the vertex formed by the sides of the angle.

Camera: As used in this disclosure, a camera is a sensor that converts light into electric signals that encode and records the spatial orientation of the captured light in a manner that reproduces the images seen by a human eye.

Cant: As used in this disclosure, a cant is an angular deviation from one or more reference lines (or planes) such as a vertical line (or plane) or a horizontal line (or plane).

Field of View: As used in this disclosure, a field of view refers to one or more angles which delimits an area from which electromagnetic radiation will be sensed by a person or an image sensor.

Hang: As used in this disclosure, to hang an object is to suspend an object above a surface from above such that the inferior end of the object does not form a significant portion of the load path of the object.

Hinge: As used in this disclosure, a hinge is a device that permits the turning, rotating, or pivoting of a first object relative to a second object.

Hook: As used in this disclosure, a hook is an object that is curved or bent at an angle such that items can be hung on or caught by the object.

Image Sensor: As used in this disclosure, an image sensor receives light from the exterior of the image sensor and converts the received light into a digital representation of sufficient detail to allow a logic module to create and display a visual reproduction of the source of the captured light.

Inferior: As used in this disclosure, the term inferior refers to a directional reference that is parallel to and in the same direction as the force of gravity.

Laptop Computer: As used in this disclosure, a laptop computer is a computer that further incorporates into a single housing: 1) a mechanism to provide tactile inputs; 2) a mechanism to provide visual and audio outputs; 3) a mechanism to receive digital or analog inputs from an external mechanical device; and, 4) a mechanism to provide digital or analog outputs to an external mechanical device. The single housing is sized such that the laptop computer can be transported by a single person.

Lock: As used in this disclosure, a lock is a fastening device that secures a rotating mechanical device into a fixed position.

Mirror: As used in this disclosure, a mirror is a surface that is designed to reflect light with a minimum of dispersion or absorption. A mirror may or may not be formed with curved surfaces that are used to concentrate or disperse the light that reflects off the mirror.

Orientation: As used in this disclosure, orientation refers to the positioning of a first object relative to: 1) a second object; or, 2) a fixed position, location, or direction.

Personal Data Device: As used in this disclosure, a personal data device is a handheld logical device used for managing personal information and communication. Examples of personal data device include, but are not limited to, cellular phones, tablets, and smartphones.

Pivot: As used in this disclosure, a pivot is a rod or shaft around which an object rotates or swings.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk-like appearance. As defined in this disclosure, plates may be made of any material, but are commonly made of metal, plastic, and wood. When made of wood, a plate is often referred to as a board.

Superior: As used in this disclosure, the term superior refers to a directional reference that is parallel to and in the opposite direction of the force of gravity.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A catoptric system comprising:
   a plurality of mirrors, a plurality of hooks, and a plurality of hinges;
   wherein the hinges contained within the plurality of hinges assemble the plurality of mirrors;
   wherein the hinges contained within the plurality of hinges assemble each of the plurality of hooks;
   wherein the catoptric system is an optical device;
   wherein the catoptric system is configured for use with a personal data device;
   wherein the plurality of hooks attach the plurality of mirrors to the personal data device;
   wherein the personal data device is further defined with a camera and a display;
   wherein the camera mounts on the display;
   wherein the camera is further defined with a field of view;
   wherein the catoptric system is configured for use with the camera;
   wherein the catoptric system attaches to the personal data device such that the field of view of the camera is adjusted without adjusting the position of the camera relative to the display;
   wherein the plurality of hinges further change the orientation of the plurality of mirrors to each other;
   wherein the plurality of hinges attach the plurality of mirrors to the personal data device such that the orientation of the plurality of mirrors can be adjusted relative to the camera.

2. The catoptric system according to claim 1 wherein the plurality of hinges are configured such that the catoptric system collapses into a flat structure for storage.

3. The catoptric system according to claim 2
   wherein the plurality of mirrors comprises a first mirror and a second mirror;
   wherein the first mirror attaches to the second mirror;
   wherein the plurality of mirrors is further defined with a plurality of optical references;
   wherein the plurality of optical references comprises a collection of angles and rays that define the optical properties of the catoptric system;
   wherein the plurality of optical references further comprises a plurality of reflection angles and a plurality of rays;
   wherein the plurality of reflection angles is further defined with a first incident angle and a second incident angle;
   wherein the plurality of rays is further defined with a first reflected ray, a second reflected ray, and an incident ray;
   wherein the first mirror is further defined with the first incident angle selected from the plurality of reflection angles;
   wherein the first mirror is further defined with the first reflected ray selected from the plurality of rays;
   wherein the first mirror is further defined with a first perpendicular;
   wherein the second mirror is further defined with the second incident angle selected from the plurality of reflection angles;
   wherein the second mirror is further defined with the second reflected ray selected from the plurality of rays;
   wherein the second mirror is further defined with a second perpendicular.

4. The catoptric system according to claim 3
   wherein the first mirror is a flat mirror;
   wherein the second mirror is a flat mirror;
   wherein the first mirror reflects the incident ray from the camera to the second mirror as the first reflected ray;
   wherein the second mirror reflects the first reflected ray from the first mirror to a new field of view as the second incident angle;
   wherein the first perpendicular refers to is the line that projects perpendicularly away from the reflective surface of the first mirror at a point where the incident ray intersects the first mirror;
   wherein the second perpendicular refers to is the line that projects perpendicularly away from the reflective surface of the second mirror at a point where the first reflected ray intersects the second mirror.

5. The catoptric system according to claim 4
   wherein the camera further comprises a field of view;
   wherein field of view of the camera is the incident ray;
   wherein the first reflected ray is a ray that is formed by the incident ray after reflection off the first mirror;
   wherein the second reflected ray is a ray that is formed by the first reflected ray after reflection off the second mirror;
   wherein the first incident angle is defined as an angle between the incident ray and the first perpendicular of the first mirror;
   wherein the second incident angle is defined as an angle between the first reflected ray and the second perpendicular of the second mirror.

6. The catoptric system according to claim 5
   wherein the plurality of hooks comprises a first hook and a second hook;
   wherein the first hook is a structure that hangs the plurality of mirrors from the personal data device such that the incident ray of the camera is in line with the first mirror;
   wherein the second hook is a structure that hangs the plurality of mirrors from the personal data device such that the incident ray of the camera is in line with the first mirror.

7. The catoptric system according to claim 6 wherein the plurality of hooks hang the plurality of mirrors from the superior surface of the display.

8. The catoptric system according to claim 7
   wherein the first hook comprises a first plate and a second plate;
   wherein the second hook comprises a third plate and a fourth plate;
   wherein the first plate is a rectangular plate structure;
   wherein the second plate is a rectangular plate structure;
   wherein the third plate is a rectangular plate structure;
   wherein the fourth plate is a rectangular plate structure.

9. The catoptric system according to claim 8
   wherein each of the plurality of hinges is a locking hinge;
   wherein the plurality of hinges lock the plurality of optical references into a fixed position.

10. The catoptric system according to claim 9 wherein each of the plurality of hinges fixes the orientation between two components selected from the group consisting of the combination of the plurality of mirrors and the plurality of hinges.

11. The catoptric system according to claim 10
    wherein a subset of the plurality of hinges assemble the plurality of mirrors;
    wherein a subset of the plurality of hinges assembles each of the plurality of hooks.

12. The catoptric system according to claim 11
    wherein the plurality of hinges comprises a plurality of hinge angles;
    wherein each of the plurality of hinge angles is a cant that is formed by each hinge selected from the plurality of hooks;
    wherein the plurality of hinge angles are adjusted to adjust the plurality of optical references;
    wherein the plurality of hinge angles are adjusted to adjust the fit of the plurality of hooks to the personal data device.

13. The catoptric system according to claim 12
    wherein the plurality of hinges further comprises a first hinge, a second hinge, a third hinge, a fourth hinge, and a fifth hinge;
    wherein the first hinge is used to assemble the first hook;
    wherein the second hinge is used to assemble the second hook;
    wherein the third hinge is used to attach the first hook to the first mirror;
    wherein the fourth hinge is used to attach the second hook to the first mirror;
    wherein the fifth hinge is used to attach the first mirror to the second mirror.

14. The catoptric system according to claim 13
    wherein the plurality of hinge angles comprises a first hinge angle, a second hinge angle, and a third hinge angle;
    wherein the first hinge sets the first hinge angle;
    wherein the second hinge sets the first hinge angle;
    wherein the third hinge sets the second hinge angle;
    wherein the fourth hinge sets the second hinge angle;
    wherein the fifth hinge sets the third hinge angle.

15. The catoptric system according to claim 14
    wherein the first hinge angle is a measure of the angle between the first plate and the second plate of the first hook;
    wherein the second hinge angle is a measure of the angle between the first mirror and the first plate of the first hook;
    wherein the third hinge angle is a measure of the angle between the first mirror and the second mirror.

16. The catoptric system according to claim 15
    wherein the first hinge attaches the first plate to the second plate to form the first hook such that the first plate rotates relative to the second plate to form the first hinge angle;
    wherein the second hinge attaches the third plate to the fourth plate to form the second hook such that the third plate rotates relative to the fourth plate to form the first hinge angle;
    wherein the third hinge attaches the first plate of the first hook to the first mirror such that the first plate rotates relative to the first mirror to form the second hinge angle;
    wherein the fourth hinge attaches the third plate of the second hook to the first mirror such that the third plate rotates relative to the first mirror to form the second hinge angle.

17. The catoptric system according to claim 16 wherein the fifth hinge attaches the first mirror to the second mirror such that the second mirror rotates relative to the first mirror to form the third hinge angle.

18. The catoptric system according to claim 17 wherein the first hinge angle is set on the first hook and the second hook such that the catoptric system will hang from the superior edge of the display of the personal data device.

19. The catoptric system according to claim 18
    wherein the first incident angle adjusts by adjusting the second hinge angle between the first hook, the second hook, and the first mirror;
    wherein the second incident angle adjusts by adjusting the third hinge angle between the first mirror and the second mirror.

20. The catoptric system according to claim 19
    wherein the catoptric system is assembled such that the third hinge angle will always equal the sum of the first incident angle and the second incident angle;
    wherein the catoptric system is assembled such that when the third hinge angle is a right angle, the second reflected ray will be parallel to and in the reverse direction of the incident ray.

* * * * *